United States Patent [19]

Kummer et al.

[11] 4,223,978
[45] Sep. 23, 1980

[54] MECHANICAL OPTICAL FIBER SWITCHING DEVICE

[75] Inventors: Raymond B. Kummer, Norcross; Stephen C. Mettler, Decatur; Calvin M. Miller, Lilburn, all of Ga.

[73] Assignee: Bell Telephone Laboratories, Incorporated, Murray Hill, N.J.

[21] Appl. No.: 19,098

[22] Filed: Mar. 9, 1979

[51] Int. Cl.² ............................................. G02B 5/14
[52] U.S. Cl. .................. 350/96.20; 350/96.21
[58] Field of Search ........................ 350/96.20, 96.21

[56] References Cited

U.S. PATENT DOCUMENTS

| 3,919,037 | 11/1975 | Miller | 350/96.21 |
|---|---|---|---|
| 4,033,669 | 7/1977 | Hanson | 350/96.20 |
| 4,057,448 | 11/1977 | Miller | 350/96.21 |

FOREIGN PATENT DOCUMENTS 2016498  11/1971  Fed. Rep. of Germany ........ 350/96.21

OTHER PUBLICATIONS

P. G. Hale and R. Kompfner, "Mechanical Opical Fibre Switch", Electronics Letters, vol. 12, No. 15, Jul. 22, 1976, p. 388.

*Primary Examiner*—Rolf G. Hille
*Attorney, Agent, or Firm*—Sylvia J. Chin

[57] ABSTRACT

A device (70) for switching optical signal paths of the type utilizing a plurality of light-transmitting optical fibers (40, 50) comprises a flexible elongated sleeve (20) having a longitudinally continuous interior cross section (24) with a plurality of corners (30) forming fiber-aligning grooves. The sleeve loosely receives a first fiber (40) from a first sleeve end (26) and a plurality of second fibers (50) from a second sleeve end (28). Each second fiber has its coupling end biased against an assigned corner. Also, the ends of all the second fibers are contained in one transverse plane (23). The coupling end (46) of the first fiber adjacent the transverse plane and a portion (42) of the first fiber, remote from its end, is fixedly secured to the sleeve. Coupling of the first fiber with any of the second fibers is achieved by flexing the sleeve to move the first fiber end to the corner containing the selected second fiber.

13 Claims, 12 Drawing Figures

MECHANICAL OPTICAL FIBER SWITCHING DEVICE

BACKGROUND OF THE INVENTION

1. Field of the Invention

This invention relates to optical switching devices and more particularly, to devices which achieve switching by mechanically coupling different ones of light-transmitting optical fibers.

2. Description of the Prior Art

Disclosed in an article entitled "Mechanical Optical-Fibre Switch" by P. G. Hale and R. Kompfner, in *Electronics Letters*, Volume 12, No. 15, July 22, 1976, is an optical switch which utilizes a loose-fitting sleeve having an interior square cross section for accommodating the ends of the light-transmitting optical fibers to be coupled. A first fiber enters the sleeve from a first sleeve end and a pair of second fibers enter the sleeve from a second sleeve end. The ends of the second fibers bias against opposite corners of the cross section with the ends in one plane. The end of the first fiber is positioned near the ends of the second fibers. Switching is achieved by aligning the first fiber in the corner of the selected second fiber.

Two techniques for moving the first fiber are disclosed in the Hale et al article. The first technique is by pushing the first fiber transversely outside the sleeve. In the second technique disclosed, the first fiber is coated with a ferromagnetic sleeve near its end and rigidly secured to the sleeve at a point remote from its end. Movement of the first fiber is achieved by applying magnetic forces to the ferromagnetic sleeve with an electromagnet.

There is need to develop an improved optical switching device. In the first technique in Hale et al, it is difficult to seal the first sleeve end of the sleeve to prevent contamination of the fiber ends because the first fiber is moved from outside the sleeve. In the second Hale et al technique using an electromagnet, biasing the first fiber against either corner requires a continuous supply of energy, as well as a precisely controlled magnetic force.

Also, such a device should be reliable and durable for extended use. A light-transmitting optical fiber is very fragile and yet the first Hale et al technique requires its direct manipulation for switching. In the second Hale et al technique, breakage of the sleeve or of the first fiber can occur during magnetic force generated movement of the first fiber against the sleeve or the sleeve against the electromagnet.

Desirably, a mechanical optical fiber switching device can be developed which is easy to manufacture, compact, reliable, protective of the fibers against contamination, and inexpensive.

SUMMARY OF THE INVENTION

Pursuant to the invention, a mechanical optical fiber switching device has been developed in which the sleeve accommodating the optical fibers is capable of flexing and where the sleeve is flexed to move the end of the first fiber to the corner containing the selected second fiber.

The invention and its objectives, features and advantages, will be readily discerned from a reading of the description to follow of an illustrative embodiment.

DETAILED DESCRIPTION OF AN ILLUSTRATIVE EMBODIMENT

Figure 1:
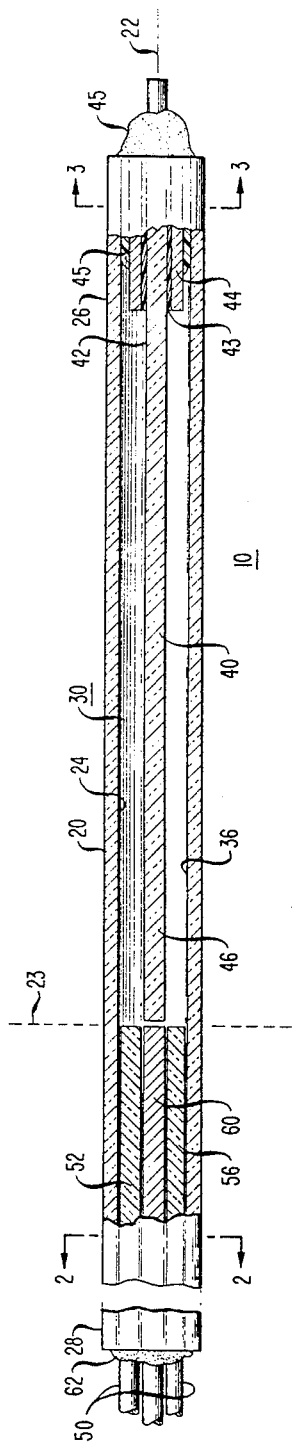
FIG. 1 depicts in partial cross sectional view one embodiment of the optical fiber switching unit made in accordance with this invention.

Illustrated in FIG. 1 is one embodiment 10 of the mechanical optical fiber switching unit made in accordance with this invention. The switching unit 10 comprises a sleeve 20 which has a longitudinal axis 22 and is capable of flexing in a direction transverse to its longitudinal axis. In the illustrative embodiment the sleeve 20 has a substantially longitudinally continuous interior square cross section 24 for receiving a first light-transmitting optical fiber 40 from a first sleeve end 26 and a plurality of second light-transmitting optical fibers 50 from a second sleeve end 28.

Figure 2:
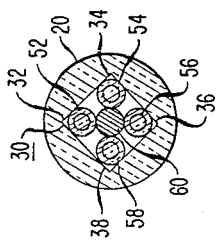
FIG. 2 is a view taken along line 2—2 in FIG. 1.

The cross section 24 advantageously includes a plurality of corners 30 with one corner 32, 34, 36, 38 associated with each second fiber 52, 54, 56, 58 respectively, as shown in FIG. 2. Longitudinally, each corner 30 forms a fiber-aligning groove. The corners 30 may be slightly rounded so long as they effectively operate as grooves and regions of stable equilibrium for the fibers. Other cross sections having other desired numbers of corners can be envisioned.

Referring back to FIG. 1, the ends of the second fibers 50 abut their associated corners 30 and are held in abutment with an aligning rod 60 which, in the illustrative embodiment, is a length of steel wire. Advantageously, spring action due to slight bends (not shown) in the wire 60 causes all of the second fibers 50 to bias sufficiently against their corners 30 so as to be precisely aligned for coupling.

The ends of the second fibers are also contained in a common plane, denoted by line 23, which is transverse to the longitudinal axis 22 of the sleeve 20. The second fibers 50 and the aligning rod 60 bond to the sleeve 20 at the second sleeve end 28 with adhesive 62 to effect a sealed end.

Figure 3:
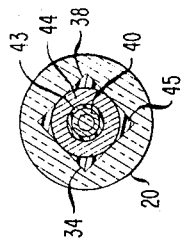
FIG. 3 is a view taken along line 3—3 in FIG. 1.

Referring to FIGS. 1 and 3, the first fiber 40 is positioned with its end 46 substantially adjacent the common plane 23. A portion 42 of the first fiber 40 is centered in and bonded to a centering tube 44 with adhesive 43. The tube 44 in turn is centered in and bonded to the first end 26 of the sleeve 20 with epoxy 45 to effect a sealed sleeve end 26. The portion 42 is remote from the end 46 so that the end 46 of the first fiber 40 suspends in cantilever fashion in the sleeve 20 when the sleeve 20 is unflexed as shown in FIG. 1.

In the illustrative embodiment, each of the light-transmitting optical fibers 40 and 50 has a core and cladding surrounded by a protective coating. Prior to insertion into the sleeve, the coating of each fiber is removed and each fiber is scored and broken to have an end surface transverse to its longitudinal axis. The coating for the first fiber 40 can terminate adjacent the tube 44 where it is then encapsulated by epoxy 45.

Index-matching fluid substantially matching the refractive index of the cores of the fibers 40 and 50 fills the sleeve 20. Advantageously, the index-matching fluid also operates as a lubricant for the end 46 of the first fiber 40. In the illustrative embodiment, the fluid is injected after the second sleeve end 28 has been sealed and before sealing the first sleeve end 26.

It has also been found desirable to remove electrostatic charges from the fibers 40, 50, as well as the sleeve 20, before their assembly so that no electrostatic forces occur. Any conventional anti-static device can be used.

In the illustrative embodiment, the sleeve 20 has an outer diameter of 0.5 mm, an inner diameter (length of side of square) of 0.25 mm, and is approximately 50 mm long. The fibers 40 and 50, each with a core and cladding, have outside diameters of 0.11 mm. The second fibers 50 are inserted about 20 mm. The first fiber 40 is inserted about 30 mm and placed within 10 to 30 $\mu$m of the plane 23. It should be pointed out that the illustrative switching unit 10 is exaggerated in the FIGURES where needed for clarity and is not accurate dimensionally.

The sleeve 20 can be constructed of glass, plastic or metal. It can also be a combination of an inner glass sleeve encapsulated in an outer metallic sleeve with epoxy, in which case the fibers 40 and 50 are inserted into and aligned in the inner glass sleeve before bonding the inner glass sleeve to the outer metallic sleeve. The outer metallic sleeve improves the durability and ruggedness of the switching unit 10. While not illustrated, the lengths of the fibers 40 and 50 extending from the sleeve 20 can be surrounded by compliant tubing for added strain relief.

Figure 4:
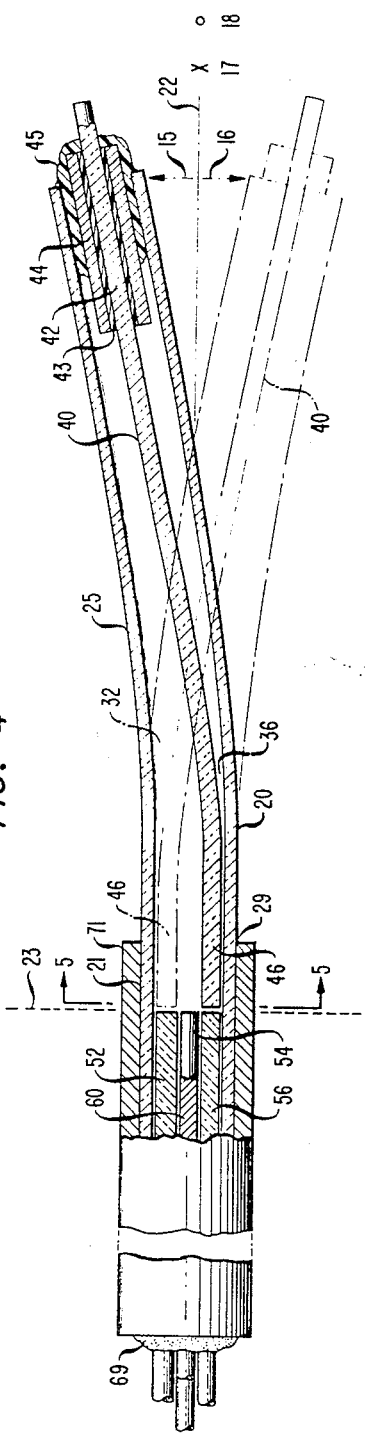
FIG. 4 depicts in partial cross section the FIG. 1 unit with one portion held rigidly in a supporting sleeve and with an unsupported portion flexed in the plane of FIG. 4.

As shown in FIG. 4, the switching unit 10 is rigidly secured and bonded to a supporting sleeve 71 with epoxy 69. The supporting sleeve 71, which attaches to an additional supporting structure to be later explained, is stationary and holds a portion 21 of the sleeve 20 (also of the switching unit 10) rigidly along the longitudinal axis 22 and against rotational movement, while a remaining portion 25 is suspended and unsupported. In this embodiment, the sleeve portion 21 extends substantially from the second sleeve end 28 to a point 29 in proximity to the common plane 23 of the ends of the second fibers 50.

The supporting sleeve 71 prevents any flexing of portion 21. The rigidly held portion is advantageously chosen to be in proximity to the common plane 23 of the second fibers 50 to ensure that the end 46 of the first fiber 40 does not undergo any substantial bending in the coupling region. This is to minimize potential angular misalignment of the first fiber 40 with any of the second fibers 50. The sleeve 71 helps to provide a particular fulcrum point for bending. It is apparent that other portions of the sleeve 20 can be held rigid.

FIG. 4 also depicts the sleeve 20 (and the switching unit 10) in a flexed state in contrast to the unflexed state in FIG. 1. In FIG. 4, the sleeve 20 has been flexed in an upward direction as denoted by arrow 15 in the plane of FIG. 4 to cause the end 46 of the first fiber 40 to move to the lower corner 36 to axially align and substantially abut with the second fiber 56.

Switching to the other second fibers 50 is accomplished by mechanically changing the direction of the flex in the sleeve 20, thereby biasing the first fiber 40 against one of the other corners 30. Shown in phantom in FIG. 4 is the sleeve 20 flexed in a downward direction as denoted by arrow 16 in the plane of FIG. 4 to show the end 46 of the first fiber biased against the upper corner 32 and axially aligned with the second fiber 52.

To bias the end 46 of the first fiber 40 against the corner 38 containing the second fiber 58 shown in FIG. 2, the first sleeve end 26 is flexed in a direction into the plane of FIG. 4 and normal to the axis 22 and the plane of FIG. 4, as denoted by the tail of arrow 17. To bias the end 46 of the first fiber 40 against the corner 34 containing the second fiber 54 shown in FIG. 2, the first sleeve end 26 is flexed in a direction coming out of the plane of FIG. 4 and normal to the axis 22 and the plane of FIG. 4 as denoted by the head of arrow 18.

FIGS. 5–8 depict the various positions of the first fiber end 46 as the sleeve 20 is flexed in the four different directions with respect to the longitudinal axis 22 of the sleeve 20 as depicted in FIG. 4.

The supporting sleeve 71 is omitted from FIGS. 5–8 for simplicity. It is apparent that the first sleeve end 26 is flexed in a direction opposite to the direction of the movement desired for the first fiber end 46.

Where the length of the unsupported portion 25 of the sleeve 20 is 30 mm, deflecting the sleeve 20 1.0 mm has been found sufficient to give effective switching action to the end 46 of the first fiber 40 (extending approximately 25 mm beyond the tube 44).

Figure 9:
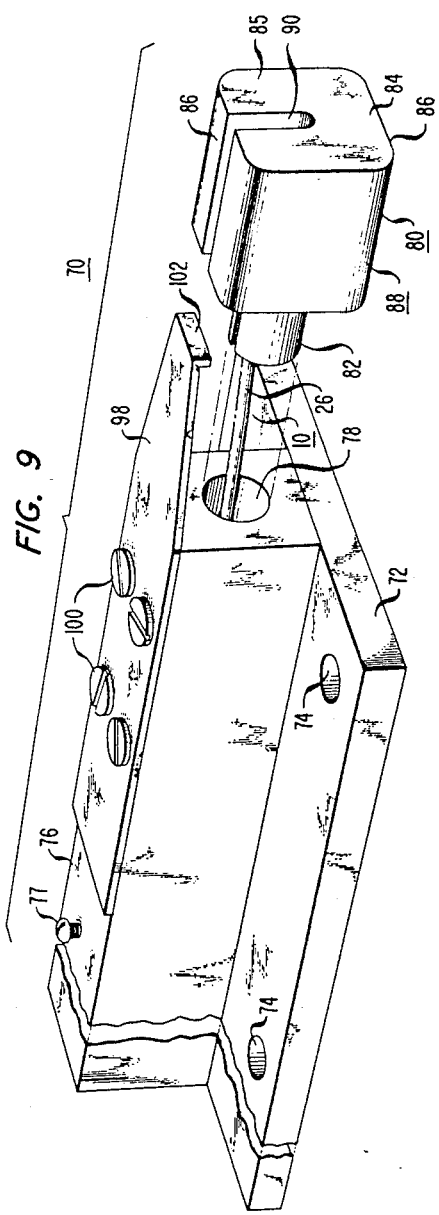
FIG. 9 shows in partial exploded perspective an illustrative embodiment of a mechanical optical fiber switching device.
Figure 10:
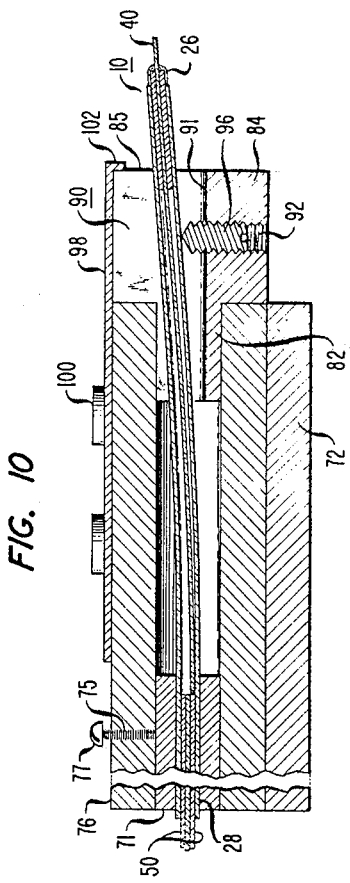
FIG. 10 shows the FIG. 9 device in longitudinal cross section.

Seen in FIGS. 9 and 10 is an illustrative embodiment 70 of an optical fiber switching device capable of mechanically flexing the sleeve 20 and maintaining the chosen direction of the flex.

The device 70 includes, besides the switching unit 10 and the supporting sleeve 71, a platform 72 with a plurality of holes 74 for attaching the device 70 to a support, a housing 76 with a thru bore 78 of a predetermined diameter, and a rotatable position selector 80.

The rotatable position selector 80 is a substantially cylindrical body having an axis of rotation. The selector 80 comprises a shaft section 82 which has an outer diameter slightly smaller than the bore 78 and a knob-like section 84 which has a plurality of reference surfaces 86 along its periphery 88. The shaft section 82 is designed to effect a sliding fit in the second end of the bore 78.

The selector 80 also includes a longitudinal slit 90 through both of the sections 82 and 84 for accommodating the first sleeve end 26 of the switching unit 10. In the knob-like section 84 is a threaded hole 92 extending from the periphery 88 to the base 91 of the slit 90. The hole 92 receives a nylon-tipped screw 96 which can be adjusted to move its tip radially with respect to the axis of the rotatable selector 80 to define the amount of deflection to be given to the switching unit 10.

A leaf spring 98, which fixedly attaches to the housing 76 with screws 100, extends beyond the housing 76 to engage the selector 80 when it is inserted in the bore 78. The free end of spring 98 has a downward extending flange 102 for engaging the end face 85 of the knob-like section 84, preventing the selector 80 from accidentally disengaging from the bore 78. The spring 98 maintains one of four preferred rotational positions for the selector 80 by pressing against one of the four flat reference surfaces 86 of the knob-like section 84. The reference surfaces 86 associate with and correspond to the direction of the four flexes.

Shown in FIG. 10 is the switching unit 10 and the sleeve 71 in position in the housing 76. The sleeve 71, which is made of brass, is cylindrical and fits snugly in the first end of the bore 78. The axes of the switching unit 10 (and the sleeve 20), the bore 78 and the selector 80 are collinear. The switching unit 10 and the supporting sleeve 71 are depicted in FIG. 10 in a position identical to that shown in FIG. 4. As can be readily seen, the rotatable position selector 80 maintains the flex of the sleeve 20 in the upward direction in FIGS. 9 and 10.

In the housing 76 is a transverse threaded hole 75 communicating with the bore 78 near its first end. A screw 77, which threads through the hole 75, can be tightened against the sleeve 71 to hold it and the switching unit 10 in place against the rotation and axial movement. The correct position of the switching unit 10 can be determined by testing the coupling between the first fiber 40 and each of the second fibers 50 when the rotatable position selector 80 is positioned in each of the four preferred rotational positions.

Figure 11:
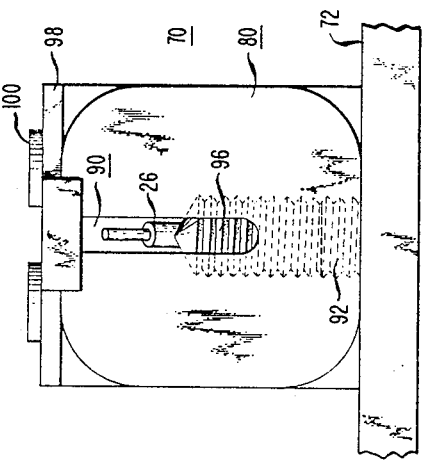
FIG. 11 depicts an end view of the FIG. 9 device.
Figure 5:
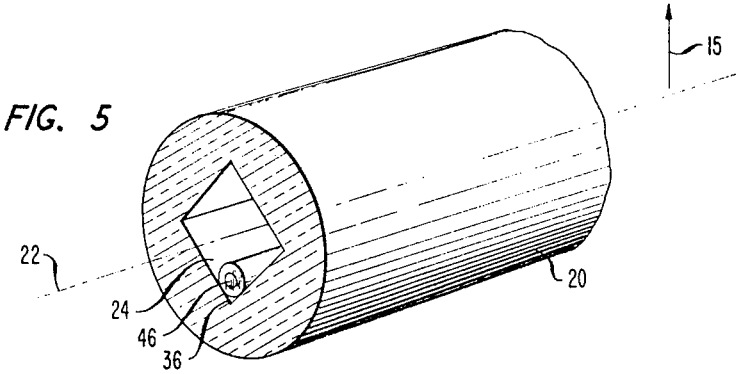
FIG. 5 is a cutaway perspective with a cross-sectional view taken along line 5—5 in FIG. 4 to depict the position of the first fiber end and the direction of its associated flex with respect to the longitudinal axis of the sleeve.

FIG. 11 shows the FIG. 9 device in end view. The end 26 of the sleeve 20 is flexed so that the first fiber 40 abuts the bottom corner 36 as shown in FIG. 5.

Figure 12:
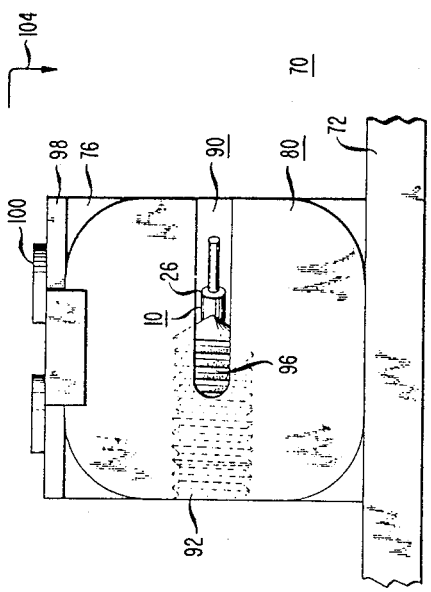
FIG. 12 depicts the selector rotated 90 degrees clockwise with respect to its position as shown in FIG. 11.
Figure 6:
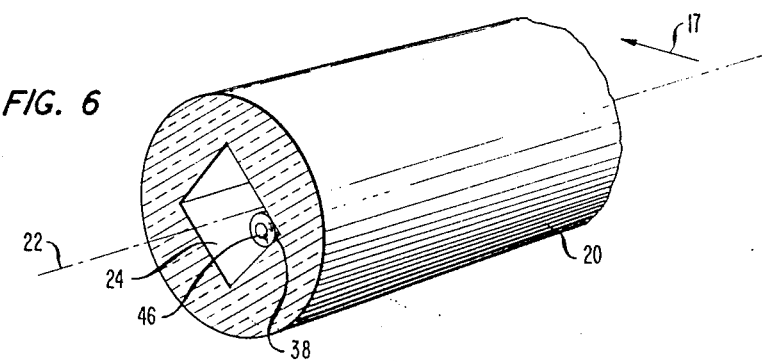
FIGS. 6-8 are views showing the other positions for the first fiber end and the directions of the flexes from the same vantage point as FIG. 5.
Figure 7:
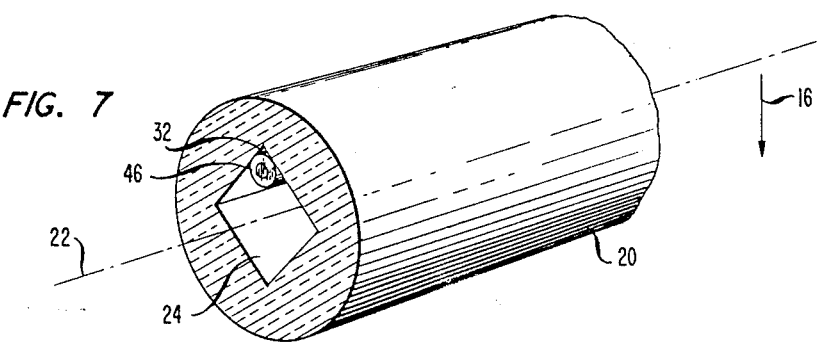
Figure 8:
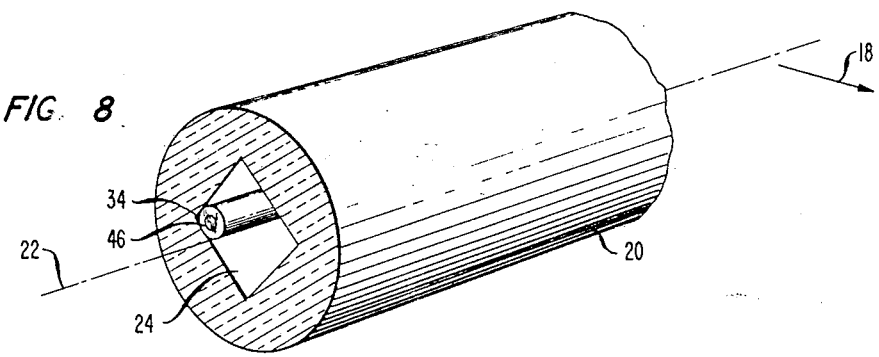

FIG. 12 shows the selector 80 rotated 90 degrees clockwise with respect to its position in FIG. 11. As a result of the 90 degree clockwise rotation denoted by arrow 104, the first end 26 of the sleeve 20 is flexed so that the end 46 of the first fiber 40 is positioned as illustrated in FIG. 6. A second 90 degree clockwise rotation will result in the first end 26 of the sleeve 20 being flexed downward so that the end 46 of the first fiber 40 is positioned as illustrated in FIG. 7. Similarly, a third 90 degree rotation in the clockwise direction will result in a position for the first fiber end 46 as shown in FIG. 8.

In the illustrative embodiment, the rotatable selector 80 is hand operated. However, it is apparent that the selector 80 can be driven, for example, with a stepping motor. Also, the selector 80 can be rotated in the clockwise or counter-clockwise direction. No torsional twisting in the first fiber 40 occurs. The direction the first fiber end 46 deflects with respect to the first sleeve end 26 merely changes.

Other mechanisms can be envisioned for flexing the switching unit 10 to produce switching. Off-center cams can be used so that the switching unit 10 can be switched into an unflexed state, as well as the differently directed flexed states.

It is also apparent that arrays of these switching devices 10 can be ganged in a tree configuration to allow switching between large groups of fibers.

While a certain illustrative embodiment of the invention has been shown and described, it should be apparent that various modifications can be made thereto without departing from the scope of the invention.

We claim:

1. A device (70) of the type for coupling an end (46) of a first light-transmitting optical fiber (40) with an end of one of one or more second light-transmitting optical fibers (50) comprising:
    an elongated sleeve (20) having a longitudinal axis (22), the sleeve also including a first (26) and second sleeve end (28) and an interior cross section (24) substantially larger than the cross section of any of the fibers, where the interior cross section is substantially longitudinally continuous and includes at least one corner (30) forming a fiber-aligning groove, where each one of the second fibers is associated with a corner and enters the sleeve from the second sleeve end, and where the first fiber enters the sleeve from the first sleeve end;
    means for fixedly biasing (60) the end of each second fiber against its associated corner such that the end faces of the second fibers are substantially contained in a plane (23) transverse to the longitudinal axis of the sleeve, the transverse plane being at some predetermined location along the length of the sleeve; and
    means for fixedly (44) securing a preselected portion (42) of the first fiber to the sleeve, where the preselected portion is some predetermined distance remote from the first fiber end, and where the first fiber end is adjacent the transverse plane such that the first fiber end can move with respect to the sleeve to axially align and substantially abut with the end of any second fiber by abutting the associated corner, CHARACTERIZED BY;
    the sleeve being capable of flexing with respect to the longitudinal axis; and
    means for flexing (80) the sleeve to move the first fiber to the corner (30) containing the selected second fiber (50).

2. The device (70) pursuant to claim 1 further comprising:
    means for confining (71) a portion (21) of the sleeve (20) in proximity to the transverse plane (23) along the longitudinal axis (22) of the sleeve (20); and
    where the flexing means (80) comprises:
    means for bending (80) the first sleeve end (26) with respect to the longitudinal axis (22) of the sleeve.

3. The device (70) pursuant to claim 1 where the fixedly biasing means (60) comprises:
    a substantially elongate rod (60).

4. The device (70) pursuant to claim 3 where the elongate rod (60) is metallic and bends along its length.

5. The device (70) pursuant to claim 2 where the bending means (80) comprises:
    means for maintaining (80) the first sleeve end (26) at a predetermined flexed position with respect to the longitudinal axis (22).

6. The device (70) pursuant to claim 2 where the bending means (80) can be rotated about the longitudinal axis (22) of the sleeve (20) to redirect the flex.

7. The device (70) pursuant to claim 5 where the maintaining means (80) comprises:
    a body having an axis of rotation including:
    means including a slit (90) substantially parallel to the axis of rotation for positioning the first sleeve end (26) off center with respect to the axis of the body; and
    means for holding (78) the body in coaxial alignment with the axis (22) of the sleeve (20), whereby the first sleeve end (26) is also offset with respect to the longitudinal axis (22) of the sleeve (20).

8. The device (70) pursuant to claim 7 where the body includes reference surfaces (86) associated with particularly directed flexes; and
   means for holding (98) the rotational position of the body by abutting a selected reference surface.

9. The device pursuant to claim 1 where the sleeve (20) comprises an inner glass sleeve and an outer metallic sleeve.

10. Method for coupling an end (46) of a first light-transmitting optical fiber (40) with an end of one of one or more second light-transmitting optical fibers (50) with apparatus (70) of the type comprising:
   an elongated sleeve (20) having a longitudinal axis (22), the sleeve also including a first (26) and second sleeve end (28) and an interior cross section (24) substantially larger than the cross section of any of the fibers, where the interior cross section is substantially longitudinally continuous and includes at least one corner (30) forming a fiber-aligning groove, where each one of the second fibers is associated with a corner and enters the sleeve from the second sleeve end, and where the first fiber enters the sleeve from the first sleeve end;
   means for fixedly biasing (60) the end of each second fiber against its associated corner such that the end faces of the second fibers are substantially contained in a plane (23) transverse to the longitudinal axis of the sleeve, the transverse plane being at some predetermined location along the length of the sleeve; and
   means for fixedly (44) securing a preselected portion (42) of the first fiber to the sleeve, where the preselected portion is some predetermined distance remote from the first fiber end, and where the first fiber end is adjacent the transverse plane such that the first fiber end can move with respect to the sleeve to axially align and substantially abut with the end of any second fiber by abutting the associated corner;
   where the method comprises the step of:
   flexing the sleeve, which is capable of flexing about its longitudinal axis, to move the first fiber to the corner containing the selected second fiber.

11. The method pursuant to claim 10 where the flexing step comprises:
   confining (71) a portion (21) of the sleeve (20), which is in proximity to the transverse plane (23), along the longitudinal axis (22) of the sleeve; and
   bending (80) the first sleeve end (26) with respect to the longitudinal axis of the sleeve.

12. The method pursuant to claim 11 where the flexing step further comprises:
   maintaining the sleeve end (26) in the deflected position with respect to longitudinal axis (22) so that the end (46) of the first fiber (40) is biased against the interior cross section (24) of the sleeve; and
   rotating the direction of the deflection to move the first fiber end to the corner containing the selected second fiber (50).

13. The method pursuant to claim 10 or 12 further comprising the step of:
   holding the sleeve (20) in the deflected position to maintain the selected coupling.

* * * * *